(12) United States Patent
Cantu et al.

(10) Patent No.: US 7,115,032 B2
(45) Date of Patent: Oct. 3, 2006

(54) DVD GAME REMOTE CONTROLLER

(75) Inventors: David Cantu, Kirkland, WA (US);
Kurt Buecheler, Palo Alto, CA (US);
Peter Sauers, San Mateo, CA (US)

(73) Assignee: The EduGaming Corporation, Palo Alto, CA (US)

( * ) Notice: Subject to any disclaimer, the term of this patent is extended or adjusted under 35 U.S.C. 154(b) by 0 days.

(21) Appl. No.: 10/987,199

(22) Filed: Nov. 12, 2004

(65) Prior Publication Data

US 2005/0227764 A1    Oct. 13, 2005

Related U.S. Application Data

(60) Provisional application No. 60/519,107, filed on Nov. 12, 2003, provisional application No. 60/577,446, filed on Jun. 4, 2004.

(51) Int. Cl.
*A63F 9/24* (2006.01)

(52) U.S. Cl. .............. 463/9; 463/40; 273/432

(58) Field of Classification Search ........... 273/138 R, 273/429–432, 460; 463/9, 40–43; 700/91–93; 340/323 R
See application file for complete search history.

(56) References Cited

U.S. PATENT DOCUMENTS

| | | | |
|---|---|---|---|
| 4,592,546 A * | 6/1986 | Fascenda et al. ............ | 463/29 |
| 4,799,678 A * | 1/1989 | Terzian et al. ............... | 463/32 |
| 5,213,337 A * | 5/1993 | Sherman ..................... | 463/40 |
| 5,519,433 A * | 5/1996 | Lappington et al. ......... | 725/110 |
| 6,565,440 B1 | 5/2003 | Hames ......................... | 463/39 |
| 6,565,441 B1 | 5/2003 | Hames et al. ................. | 463/39 |
| 6,786,822 B1 | 9/2004 | Leifer .......................... | 463/37 |
| 6,794,992 B1 | 9/2004 | Rogers ................. | 340/825.25 |
| 2004/0054826 A1 | 3/2004 | Kavanagh ..................... | 710/62 |
| 2004/0132533 A1 | 7/2004 | Leifer ........................... | 463/42 |

FOREIGN PATENT DOCUMENTS

EP         1 400 267 A1     3/2004

OTHER PUBLICATIONS

Trivia NEWS, A New Trivial Pursuit Game Combines America's Love of Pop Culture and DVDs with New Edition: Trivial Pursuit DVD Pop Culture, press release Nov. 16, 2003 downloaded from internet site (www.trivialpursuit.com/trivialpursuit/news_index.html), 2 pp.*

Fisher-Price –Your Source for Toys, Playtime Ideas, Parenting Advice and More, "Interactv," URL=http://www.fisher-price.com/us/interactv/intro.asp, download date Nov. 2, 2004, 3 pages.

Declaration of Kurt Buecheler dated Feb. 5, 2006.

* cited by examiner

*Primary Examiner*—Mark Sager
(74) *Attorney, Agent, or Firm*—Seed IP Law Group PLLC (57) ABSTRACT

Methods and systems for enhancing a DVD-based game using a remote controller are provided. Example embodiments provide a DVD game remote controller "DGRC," which provides input to DVD-based games, access to additional game functions and special features such as game hints, enhanced timing and scoring functions, die roll simulation, and support for buzz-in remotes. The buzz-in remotes provide automated support for turns in which multiple participants can respond to challenges. In one embodiment, the DGRC provides a transmitter, an integrated display screen, game-related selection buttons, navigation buttons, a roll button, a timer button, a score button, and a media slot. The DGRC also provides buzz-in remotes and a receiver for receiving signals therefrom.

60 Claims, 4 Drawing Sheets

DVD GAME REMOTE CONTROLLER

BACKGROUND OF THE INVENTION

1. Field of the Invention

The present invention relates to a remote controller for electronic games and, in particular, to a programmable remote controller for DVD-based electronic games and associated methods.

2. Background Information

Games that are played electronically, such as those played on a game console or computer system, are typically made available to potential game players on media targeted to portable game consoles; on media playable by personal computers, such as CDROMs and other portable media; or by downloading game software from a network. To date, personal computer ("PC") based games are typically individual games or games that are connected to other players (such as massive multi-player role based games) via one or more networks. Typically, the standard input devices used to control other aspects of the PC, such as a keyboard and mouse, are used to control the game. External input devices, such as joysticks, are sometimes integrated to enhance the gaming experience.

Multiplayer and portable game consoles, on the other hand, provide self contained environments, sometimes with wired controllers that allow one or more players to control a game displayed on a display screen attached to the console, such as a standard television ("TV"). A media containing the game and designed specifically to operate with the game console logic is loaded into the console, and the wired controller provides player input to control content display on the TV. Handheld game consoles are typically single player games that may display content and feedback on an integrated small LCD display. Examples, such as electronic versions of poker, puzzles, etc. abound. In general, these devices suffer in their ability to provide a rich, visual and auditory experience due to physical limitations of the game consoles.

To date, Digital Video Disc or Digital Versatile Disc ("DVD") technology has been used largely to play movies and to present other types of video content, oftentimes accompanied by audio. DVD technology was developed as an improvement over the sequential technologies previously available with Video Cassette Recorder technology, by providing an ability to access video segments on an "addressable" basis instead of sequentially, from the beginning of the media. However, to provide an optimal environment for the narrow purpose of playing videos such as movies, DVD technology imposes many constraints on the format of DVD media used to store the content and on the processing and storage capacities of DVD players. The only functions that a DVD player is really meant to perform are to play videos (with or without audio), to present menus, which upon selection of an item, enable the video player to navigate to play a different video segment, and to support general playback control such as speed control, skip to next content segment, etc. A DVD medium that stores such content is hereinafter referred to as a "DVD" and the machine or system used to play/present the DVD content referred to as a "player" or a "DVD player." Board games have been developed that integrate the use of a DVD player to incorporate content from a DVD much as a game participant would select a next card from a game-specific set of cards. Examples include games such as Trivial Pursuit® DVD Pop Culture Edition by Hasbro, which adds media questions selectable from a DVD in addition to traditional card selection.

BRIEF SUMMARY OF THE INVENTION

Embodiments of the present invention provide a specialized remote control device for use with DVD-based electronic games ("DVD-based games"), herein referred to as a DVD Game Remote Controller (a "DGRC"). The DGRC is used to enhance a DVD-based game by providing easy and direct navigation to game functions; access to game-specific functions and special features; and enhanced timing (e.g., additional timers), game movement (e.g., die roll simulation), and scoring functions; as well as enhanced support for arbitration between participants. For example, the DGRC may arbitrate between participants when multiple participants are allowed to respond to a game challenge during the same turn.

In one example embodiment, the DGRC comprises one or more functional components/modules that work together to accomplish these functions. For example, a DGRC may comprise an integrated display screen; game related selection buttons such as colored selection buttons, text labeled buttons, and navigation buttons; a roll button; a timer button; a score button; and a media slot. Other buttons, controls, and selectors are also possible. The DGRC also includes transmitter for sending signals to an associated DVD player and, in some embodiments, a receiver for receiving signals from other devices. The DGRC may also include one or more buzz-in remotes that provide signaling from one or more associated participants, such as during game turns where multiple participants are permitted to respond. Each remote may comprise a buzz-in button for signaling the DGRC and a special feature button.

DETAILED DESCRIPTION OF THE INVENTION

Embodiments of the present invention provide a specialized remote control device for use with DVD-based electronic games ("DVD-based games"), herein referred to as a DVD Game Remote Controller (a "DGRC"). As used herein, DVD-based games are either self-contained "DVD games" that provide game logic as well as game content, such as those authored by the DVD platform described in detail in U.S. Provisional Application No. 60/577,446, entitled "DVD Game Architecture," or are "DVD-enabled games" that use the DVD player as a passive auxiliary component that presents content from a DVD similar to a deck of cards. DVD-enabled games may include, for example, DVD-enabled board games as well as DVD-enabled electronic games such as personal game consoles that utilize a TV to display files from a DVD medium.

The DVD Game Remote Controller (a "DGRC") is used to enhance a DVD-based game by providing easy and direct navigation to game functions; access to game-specific functions and special features; and enhanced timing (e.g., additional timers), game movement (e.g., die roll simulation), and scoring functions; as well as enhanced support for arbitration between participants when multiple participants can respond to a game challenge during the same turn. The DGRC provides easy and direct navigation by directly mapping buttons or other components of the controller to game functions, such as selection of a particular category, to make using the DGRC more efficient and more participant-friendly. Game-specific functions and special features may include such aspects as audio hints to assist game participants, instructions for game play, special bonus features, etc. The DGRC may provide timers, die roll simulation, and scoring enhancements that can be substituted for those already available or used as supplements, depending upon how a particular game chooses to integrate the DGRC capabilities. In addition, through the use of additional memory media connected to the DGRC, the capabilities of the DGRC can be modified to provide game-specific functionality such as particular scoring methods or timers, general enhancements or updates to the control capabilities of the DGRC itself, and potentially additional game content or control by downloading additional content or control instructions to the local memory of the DGRC. Distribution of a DVD-based game for use with the DGRC may include one or more such memory media to enhance the overall gaming experience.

A DGRC can be incorporated into a DVD-based game according to a wide spectrum of integration. For example, DVD-based games can be specifically authored to take advantage of the capabilities of the DGRC such as direct navigation to game functions in order to provide a richer audio and visual interactive player experience. Well-known DVD authoring techniques, available using programs on the market, such as DVD Studio Pro 2.0 from Apple Computer, Inc., can be used to map game-specific menu selections to individual buttons or other input selectors on the DGRC. These dynamic, game-specific mappings allow game participants the ability to access game-specific menu options with the click of a single button instead of using the standard navigation and select buttons available on traditional remote controllers, which require multiple button presses to make each choice.

Alternatively, the DGRC can be incorporated into a DVD-based game without any knowledge on the part of the game author to provide additional capabilities such as concurrent turn arbitration which results in one participant's selection being communicated to the DVD player. The phrase "concurrent turn" or "simultaneous turn" refers to a game turn in which multiple participants are engaging in attempting to respond to a challenge and does not necessarily require that two or more responses coincide precisely in time. For example, buzz-in remotes, described further below, can be used to select one of several game participants that are attempting to respond to a particular challenge, and then sending one response indicator that corresponds to the selected participant to the DVD player. In this manner, an existing DVD-based game can be enhanced to support concurrent turn arbitration without changing the game. One skilled in the art will recognize that many interim levels of integration of a DGRC into DVD-based games also can be defined.

The DGRC will be described as it is contemplated for typical use with a DVD-based game such as question and answer (Q&A) type game that displays questions from a multitude of categories. Other types of game content and uses of a DGRC are of course contemplated, and one skilled in the art will appreciate that a Q&A game is merely exemplary. In a typical DVD-based Q&A game, game content is provided on a DVD (medium) capable of being read by a DVD player and displayed on a display device. In the DVD-games described in U.S. Provisional Application No. 60/577,446, game control is also provided on the DVD itself and the game logic encoded in the DVD game selects content to be displayed on a display screen connected directly or indirectly to the DVD player (a "DVD player display screen"). In contrast, in a DVD-enabled game environment, control is provided outside of the DVD technology, for example, by a game participant in the case of a DVD-enabled board game, or by an auxiliary device such as a personal computer or code resident on the DGRC, which selects content to be displayed on the DVD player display screen.

Figure 1:
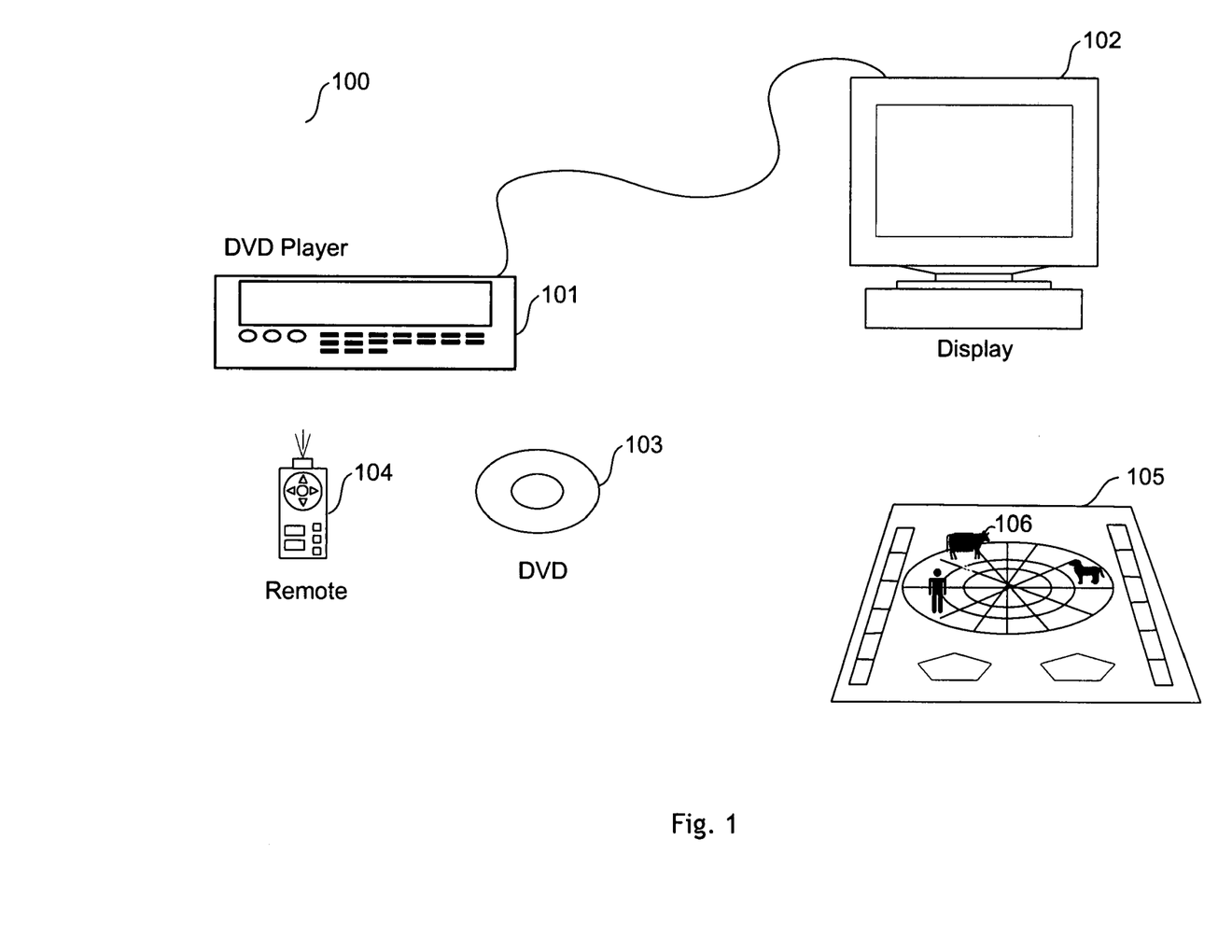
FIG. 1 is a block diagram of an example DVD-based game environment that incorporates a DVD Game Remote Controller.

FIG. 1 is a block diagram of an example DVD-based game environment that incorporates a DVD Game Remote Controller. Although many different configurations are possible, a DVD-based Q&A game for use with the present invention is typically distributed on a DVD 103 and played by one to four participants using a DVD player 101, a DVD player display screen 102, and a DGRC 104. For DVD-enabled games, a game board 105, and game pieces 106 that represent each participant may also be provided. In typical operation, the game content from DVD 103 is displayed by the DVD player 101 on the DVD player display screen 102 and participants manipulate the DGRC 104 to advance game flow. Game pieces, when used, are typically advanced on the game board in concert with the displayed game content and the game flow logic. In the case of DVD-games, a game board (not shown) and scoring mechanisms can be integrated into the game itself and displayed on the DVD player display screen. In the case of DVD-enabled games such as those provided in DVD-enabled board games available currently, the game board and game pieces can be a separate physical board such as board 105 and pieces 106. Alternatively, the game board can be physically integrated into the DGRC 104 and the game pieces moved on the DGRC 104 by game participants, or may be virtually represented on a display screen that is integrated into the DGRC 104. Embodiments that integrate a game board and game pieces into the DGRC (physically or virtually) are described further with respect to FIG. 3.

In one example embodiment, the DGRC comprises one or more functional components/modules that work together to provide DVD game-specific functions, DVD player functions, DGRC functions, and other capabilities. The description that follows is an example embodiment of one such DGRC, which refers to Q&A DVD-based games. As mentioned, one skilled in the art will recognize that many of the techniques and apparatus described herein may be applied to other types of games and to other game content. One skilled in the art will recognize that some of the components or portions thereof may be implemented in hardware, software, firmware, or some combination, using well-known techniques, programming languages, hardware, etc. Also, in the following description, numerous specific details are set forth, such as data formats and code sequences, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow.

Figure 2:
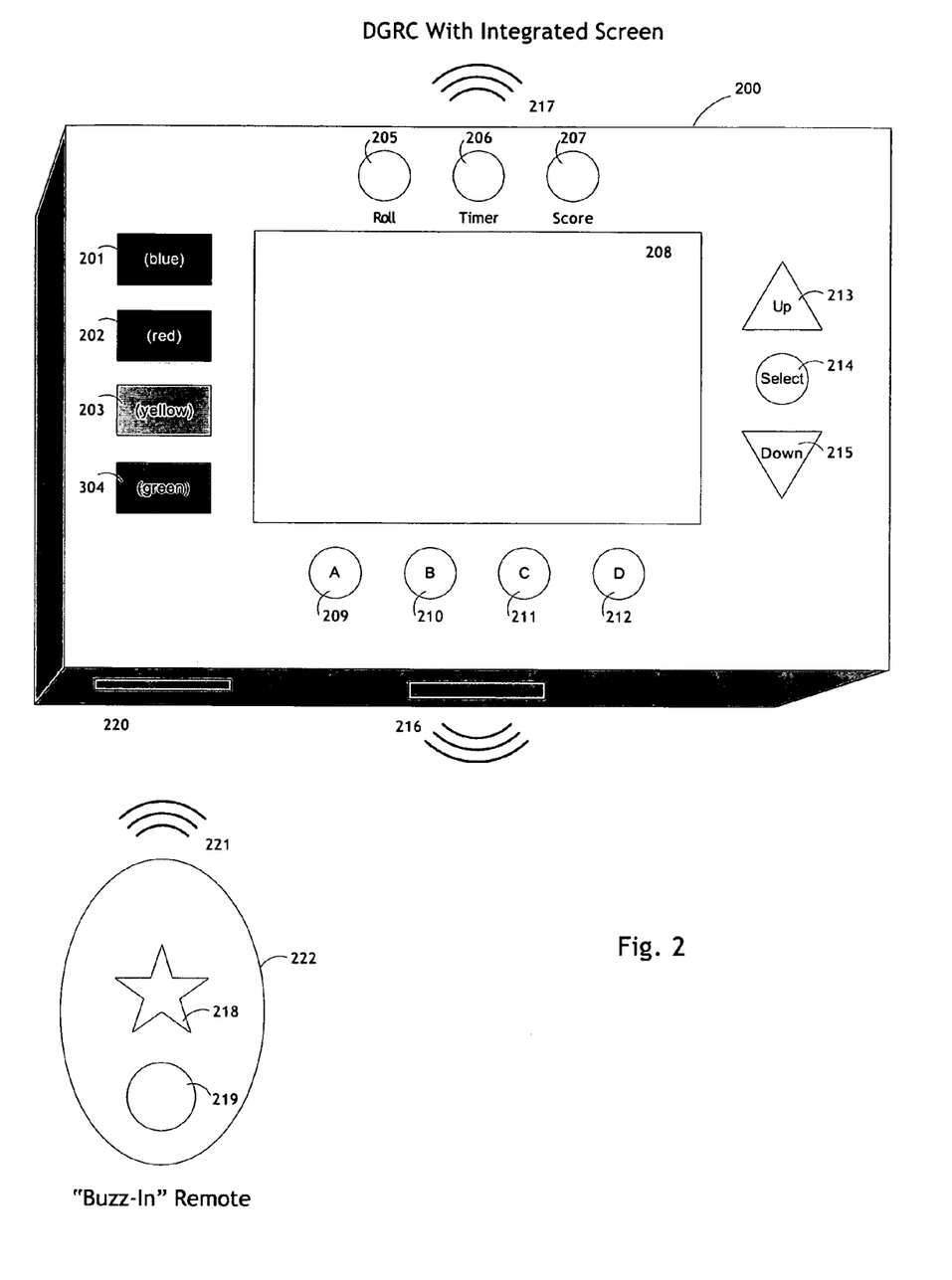
FIG. 2 is a block diagram of an example DVD Game Remote Controller with an integrated display screen.

FIG. 2 is a block diagram of an example DVD Game Remote Controller with an integrated display screen. The DGRC 200 is shown with an integrated display screen 208; game related selection buttons such as colored selection buttons 201–204, text labeled buttons 209–212, and navigation buttons 213–215; a roll button 205; a timer button 206; a score button 207; and a media slot 120. These buttons and components are merely representative of the types of components that can be included in an embodiment of the DGRC 200. Depending upon the DVD-based game content, different components with different shapes, texture, color, etc. may be more appropriate. Also, additional or different types of selectors and controls, such as sliders, rotating devices, etc. can also be incorporated. The DGRC 200 also includes transmitter 217 for sending signals (indicating operations, actions, commands, etc.) to an associated DVD player and a receiver 216 for receiving signals from other devices.

The DGRC 200 also includes four "Buzz-In" remotes 222, each with a buzz-in button 219 and special feature button 218. The number of remotes depends upon the number of game participants supported by the DGRC 200. The Buzz-In remotes 222 communicate with the DGRC 200 by means of transmitting signals, such as infrared signals or radio frequency transmitters, via transmitter 221 which are received by the corresponding receiver 216 of the DGRC 200. For buttons that cause the DGRC to send signals to the DVD player, the DGRC transmits signals via transmitter 217. These signals are dependent upon the type of signals recognized by the DVD players, which are typically infrared. One skilled in the art will recognize, however, that other signal transmission media and signal types, both existing and to be developed in the future, may be used to with the DGRC.

In typical operation, game participants use the DGRC 200 to influence and interact with the game content and game flow by pressing buttons on the DGRC 200, such as buttons 201–204, and through resultant interactions between the DVD player and the DGRC. When the DGRC 200 receives input, for example, through button presses or from the buzz-in remotes, it sends signals as appropriate to the DVD player to specify actions. The correspondence between which DVD actions to invoke and the DGRC 200 buttons is referred to herein as a button map. Based upon the received signals (which translate to actions), the DVD player reads the game content from the DVD and displays the game content on the DVD player display screen along with instructions or other indications for advancing game flow. When game participants advance the game flow, for example, by answering questions correctly or by completing a "turn" in some other game-specific manner, the game state is changed to reflect a score for that participant or to advance the participant in a game appropriate way. The manner in which the game state is changed is typically dependent upon the particular configuration and type of DVD-based game. In participant controlled DVD-based games, the participants move their game pieces in the manner indicated by the game, thus changing the game state to reflect the score. In embodiments in which the participant advancement or scoring is automated by the DVD content or by the DGRC, when the game flow logic detects the completion of a turn, for example, as a result of a die roll or indication of completion, the game flow logic changes the game state accordingly and may indicate a score on the DVD player display screen or on the integrated display screen 208. It is to be understood that, in instances where only one example is described, complementary descriptions for the for various configurations are contemplated.

The integrated display screen 208 may be used for any purpose that can be contemplated for incorporation with a DVD-based game. For example screen 208 may be used to present game instructions or additional game content. In addition, one or more display screens such as screen 108 may be integrated into the DGRC for presenting other information, such as individual or cumulative scoring information, timers, simulated die rolls, participant statistics, animations, etc. or a virtual representation (or abstraction) of the game.

The DGRC 200 supports different kinds of buttons that can be mapped (programmed) to access game-specific functions, DVD player functions and remote controller functions. These buttons are preferably manufactured to visually correspond to game choices by attributes such as color, shape, and text. One skilled in the art will recognize that the indication used is typically based upon the intended audience. For example, if the audience speaks primarily a language that is not English, the buttons are labeled in a manner that doesn't depend upon knowledge of English, such as symbols, color, shape, etc. Moreover, the buttons might be labeled in a manner that can be understood by the hearing or visually impaired, or tailored for a specific age group.

The embodiment shown illustrates one such set, and one skilled in the art will recognize that many other types of controls could be mapped in a similar manner. The colored selection buttons 201–204 include, for example, four differently colored buttons 201–204, which a game can incorporate to differentiate game content selections based upon color coding. For example, if the game is currently displaying categories of questions, each associated with a different color, on, for example, the DVD player display screen or on the integrated display screen 208, then a game participant can press one of the blue button 201, red button 202, yellow button 203, and green button 204 to select the question category that has been previously mapped to that button. The text labeled buttons 209–212 are similarly used to allow a participant to select between four items using the "A" labeled button 209, the "B" labeled button 210, the "C" labeled button 211, and the "D" labeled button 212. One skilled in the art will recognize that selections other than menu items may be selected by buttons 201–204 and 209–212 using these same techniques.

The roll button 205, when pressed, can be used to initiate a simulated die roll that is displayed on the integrated display screen 208. For example, when a game participant presses the roll button 205, the integrated display screen 208 then displays a color or a number or other visualization of the roll (e.g., the face of the die) that is randomly selected by logic (code) provided by the DGRC 200. For example, the DGRC 200 may select a number and display a visualization of a number between one and six. Or, as another example the DGRC 200 may select a color that corresponds to one of the color buttons 201–204. If applicable, the participant's game piece is then moved the number of spaces on the game board (physical or virtual) to correspond with the number displayed on the screen. This movement or scoring adjustment may be automatically performed by the DGRC 200 if the board is displayed and integrated into the DGRC 200 or if the board representation or scoring is provided by the DVD game. Otherwise, the participant may be required to physically move the game piece on a physical board. Die roll functionality may even be incorporated into game logic that is provided by the DGRC 200 independent of the DVD-based game. For example, the DGRC 200 may support additional types of game function such as scoring enhancements based upon simulated die rolls even though they were not contemplated when the DVD-based game was shipped.

The timer button 206, when pressed, controls access to timer functions of the DGRC 200. For example, when a game participant presses the timer button 206, the DGRC 200 displays on integrated display screen 208 a countdown from some number of seconds (e.g., 30 seconds) to zero. In embodiments of the DGRC 200 that have speakers and audio capabilities, the timer count down may be accompanied with countdown music and sound effects. The timer functions can be used to limit the amount of time a game participant is allowed to complete a task. The amount or time, start, stop, and reset values may be implemented on the DGRC 200 either as explicit buttons (not shown) or by programming additional buttons of the DGRC 200 to further control the timer function when in a "timer" mode. For example, the DGRC 200 could define that pressing a navigation button such as buttons 213 and 215, once timer "mode" is activated (by pressing the timer button 206), causes the number of initial seconds off the timer function to be incremented or decremented in intervals. Also, the DGRC could define the timer button 206 (with or without pressing another button) to invoke a timed mode of play that tracks the collective time used to respond to all the questions in a game or the collective time on a participant by participant basis. Any such timer enhancements are provided by code associated with the DGRC 200 and may be incorporated directly into the DVD-based game flow logic or used as auxiliary function to an existing game.

The score button 207, when pressed, controls access to game scoring functions of the DGRC. When used with DVD-enabled games, these scoring functions can be default (general) scoring functions that are usable independent of the game content, or functions that behave specific to the game being played. In DVD-enabled board games, there is typically no automated tracking of scores of the players—game pieces are moved on a board and a "score" is inherent in the position of the game piece on the board. Thus, the scoring function available on the DGRC 200 is often the only automated scoring available in such games. In other DVD-based game environments, some sort of scoring may already be available with the game flow logic. For example, in a DVD game, a scoreboard can be integrated with the game content and displayed on the DVD player display screen. In such environments, the DGRC may separately track the score of each game participant if it is possible to determine a current "score" from the participants' selection of buttons on the DGRC 200 independent of content selection by the DVD player. Example instances where this may be possible include games in which the score is directly accessible from a simulated die roll or games in which a score or other value is associated with a particular button. Example instances where this is more difficult include DVD games, such as Q&A games, in which the game (resident on the DVD itself) determines whether an answer is correct or incorrect. Since a DVD player is essentially a one way communication mechanism (the DRGC can control the DVD player but cannot request information), there is currently no inherent way (as typically manufactured and shipped) to have a DVD player inform the DGRC 200 of a particular status such as a score or correctness of a participant response. However, one skilled in the art will recognize that the DGRC could easily be enhanced to accommodate feedback provided by a DVD player or auxiliary attachment if such feedback were made available.

In instances where DRGC game scoring can be incorporated, the game scoring function that is executed as a result of pressing the button 207 may track each participant's score, turn by turn, or on a cumulative basis. In other modes, the function may track a score for teams or cumulatively for the entire game. Other buttons can be incorporated to edit scores or set preferences for the game scoring function such as whether scores are tracked on an individual or total basis, a color to represent for each participant, etc. For example, according to one embodiment of a DGRC, when a participant presses the score button 207, the DGRC 200 displays the scores of all of the participants on the integrated display screen 208. The score may be, for example, a graphical or numeric indication of each participant's score. The DGRC then enters a "score mode" in which a participant can use the DGRC buttons, for example, the screen navigation buttons 213–215 to edit a score. For instance, the participant can press the up arrow 213 and down arrow 215 to scroll through the participants' scores; select a particular participant's score with the select button 214, and then edit the selected score using the up arrow 213 to increase the score in increments (e.g., as defined by the memory media or DGRC defaults) and the down arrow 215 to decrease the score in increments. After the participant's score has been edited correctly, pressing the select button 214 sets the score.

Note also that the score button 207 or some other button can be used to store or view participants' statistics for a particular game or over time. A table of participant statistics may be displayed on the DGRC integrated display screen 208. Such table data may be stored on the removable memory media (if writeable) or internally in the memory inside the DGRC 200.

The media slot 220 may be used to define, modify, or update the DGRC 200 with new or different functions, auxiliary content, or redefine button mappings for the DGRC 200. Different types of media can be accommodated depending upon the particular implementation of the DGRC 200. In one embodiment, a media card such as that used in a camera (e.g., a smart card) is used. Other implementations can be supported, including but not limited to, a standard memory stick, a USB memory stick, or other memory integrated into the DGRC 200. The distributed media that is read from media slot 220 may include DGRC-specific code that updates current functions available from the DGRC 200 or new game independent or game-dependent features and functions. One skilled in the art will recognize that general DGRC functions can be overridden, supplemented, or otherwise modified to be game-specific by providing data, including potentially code, on such memory media. Examples of additional functions that may be supplied through such media include new or modified graphics for displaying participants or game-specific display graphics for presentation on the integrated display screen 208 such as a game "skin;" code for manipulating a virtual representation of a game board on the screen 208; timer functions, game scoring functions, and simulated die roll functions. In addition, new rules for arbitrating between participants using the buzz-in remotes 222 may also be supplied in this fashion. Essentially, the media slot 220 can be used to provide game-specific functionality or to update the DGRC 200 with new or modified capabilities. One skilled in the art will understand how to write and distribute code on a media using well-known techniques that will execute on the DGRC 200 and that the specifics of such code depends upon the particular hardware (processing unit and instructions) used in the DGRC 200. Example functional components of standard hardware that can be used to implement a DGRC 200 is described with reference to FIG. 4.

The "buzz-in" remotes 222 are used to provide additional game enhancements such as support for features such as "simultaneous" game play in which multiple game participants can respond concurrently to a challenge in the same turn and the DGRC 200 is responsible for arbitrating among the participants. For example, games such as Trivial Pursuit® DVD Pop Culture Edition by Hasbro provide an "ALL PLAY" mode where all the participants that have not yet correctly answered a question in a particular category are allowed to "shout out" an answer. The first participant to have answered the question correctly "wins" that turn. The buzz-in remotes 222 can be used to enhance an "ALL PLAY" type of game function by enabling the DGRC 200 to automatically determine which participant was first to respond to the challenge and give that participant the chance to select an answer button. Each buzz-in remote 222 includes a buzz-in button 219 that is used to signal the DGRC by means of transmitter 221. The DGRC receives the transmission through receiver 216. Once the DGRC 200 receives a transmission and indication of which buzz-in remote 222 has responded, the DGRC 200 can display an appropriate indication of (or instructions to) the transmitting participant on integrated display screen 208. In one embodiment, each text labeled button 209–222 (or other set of buttons) corresponds to each participant and the corresponding participant's button is backlit or otherwise given emphasis when the corresponding participant presses the buzz-in button 219 first. For example, if participant 1 corresponds to the "A" button 209, then when participant 1 presses the buzz in button 219 first, the "A" button 209 on the DGRC 200 will be backlit. Other games may incorporate different logic that defines which participant gets to respond and what that participant is permitted to do. In some embodiments, the DGRC 200 may track the ordering of the buzz-in transmissions and thus allow a second participant to respond, and so on, until a participant selects the correct response or all participants have had an option to respond. One skilled in the art will recognize that different types of arbitration logic may be similarly incorporated. It should be noted that use of the buzz-in button 219 also allows the DGRC 200 to potentially track each participant's turn, so that embodiments that support an integrated, automated game board or scoring can advance participants appropriately, especially if a simulated die function is used.

Each buzz-in remote 222 also includes a special feature button 218, which can be incorporated by games in game-specific ways to access special game features. For example, the special feature button 218 can be pressed while a question is pending to access an additional audio clue. The audio clue can then help the participant answer the pending question correctly. Additional examples of special game features include extra-bonus point questions, video clues, etc. The DGRC 200 can be programmed to invoke special functions on the DGRC 200 itself or on the DVD player (or both) upon receiving a signal from the special feature button 218 via receiver 216. Game-specific special functions for the DGRC 200 can be supplied via the memory media that is plugged into memory slot 220 or can be pre-programmed into a memory resident in the DGRC 200. When the special feature button 218 is pressed at a time that a DGRC special function is available, the DGRC 200 detects this fact and executes the appropriate code. The DGRC program code can arbitrate use of the special feature button based upon the current state of the game or by some other programmed mechanism.

When used to invoke a special feature on the DVD player, the DGRC 200, after receiving the signal via receiver 216, transmits an appropriate instruction to the DVD player using transmitter 217 to activate a special feature. For example, the transmitted instruction may command the DVD player to display DVD content that is located on track "n." The particular action taken depends upon the button mapping currently used by the DVD player, and hence the signal transmitted. One example special feature is an audio clue played on the DVD player. When the DVD player receives the signal transmitted by the DGRC 200, the DVD player executes a function that causes the audio clue to be downloaded from a predetermined location on the DVD game. One mechanism for displaying game-specific special functions on the DVD player display screen is to use an "angle feature" available on some DVD players, which supports combining a different audio track with a same video asset or combining a different video asset with a same audio track. As another example, the special feature button may cause a surprise display to appear on the DVD player display screen informing the participant that the participant has received something, for example, a bonus question, extra points, a penalty, end another participant's turn, or an order to perform a funny task. Other special features are of course possible. In addition, the DVD game can be tailored to display a shape on the DVD player display screen that corresponds to the special feature button 218 to notify the participants when a special function is available.

Figure 3:
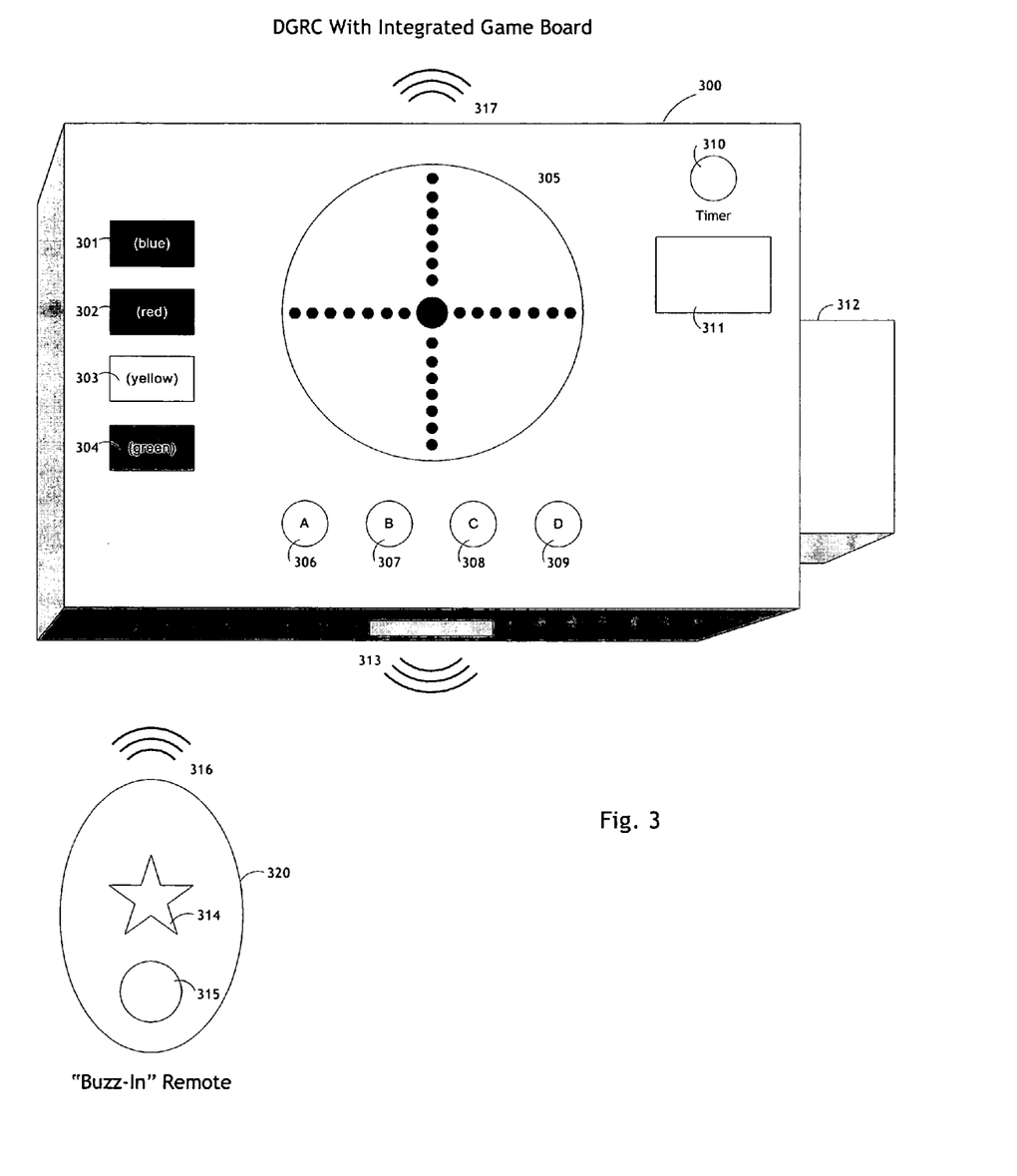
FIG. 3 is an example block diagram of an alternative DVD Game Remote Controller with an integrated game board.

FIG. 3 is an example block diagram of an alternative DVD Game Remote Controller with an integrated game board. The DGRC 300 is shown with integrated game board 305, colored selection buttons 301–304, text labeled buttons 306–309, timer button 310, timer screen 311, and (optional) game piece storage 312. The DGRC 300 also includes four "buzz-in" remotes 320, each with a buzz-in button 315 and special feature button 314, which operate typically as described with reference to FIG. 2. The colored selection buttons 301–304 and the text labeled buttons 306–309 also operate typically as described with reference to FIG. 2.

The integrated game board 305 can be used by the participants to advance virtual or physical game pieces, keep score, or other such functions. For example, in the game board demonstrated each participant can advance a game piece from the start position towards the center goal as the participant answers questions correctly. The participant who reaches the center of the board first is the winner of the game. In a DGRC where the integrated game board 305 includes virtual game pieces, participant advancements can be performed automatically by the DGRC (providing information is given to the DGRC as to which participant completed a turn and the result of that turn). Alternatively, the integrated game board 305 may be used by the game to merely reflect a (separate) physical game board, or show the completed move, etc. The option game piece storage area 312 can be used to store physical game pieces when the game is not in use.

The timer button 310 can be used as described with respect to FIG. 2 or can be used in conjunction with a timer screen 311 to toggle and start a game timer function. For example, a participant may press the timer button 310 to select a time to count down from. Pressing the button 310 at that point toggles through a predefined set of counts, such as 30 second, 45 second, and 60 second options. When the timer button 310 has been inactive for some number of seconds, a game timer function begins a count down to zero which is displayed on the timer screen 311. One skilled in the art will recognize that other alternative definitions and behavior for a timer function can be incorporated.

A DGRC such as DGRC 200 or DGRC 300 can be customized for use with different manufacturer's DVD players using standard universal remote technology, which transmits different signals to a DVD player based on a manufacturer's numeric code. However, since DGRCs can operate without numeric keys, the DGRC can be programmed in a non-numeric manner to register a manufacturer's numeric code. Once the manufacturer's code is registered with the DGRC, the DGRC transmits signals in a manner understood by the DVD player. (The signals that correspond to each manufacturer's code are programmed into the control logic of the DGRC.) For example, a game participant may press a combination of the category, multiple choice, special, and navigation buttons to convey the manufacturer's code to the DGRC. In one embodiment, the DGRC user manual contains information on how to program the DGRC for use with DVD players from several manufacturers. For example, if the game player wants to program the DGRC to work with a Sony DVD-330 player, then the manual might instruct the player to hold down the blue button 301 until the screen 308 flashes, then press the "A" button 309, the yellow button 303, the "D" button 112, and the green button 304. This code would then cause the DGRC to communicate with the DVD player using the correct Sony IR protocol.

As mentioned previously, a DGRC such as DGRC 2000 can be incorporated into a DVD-based game according to a wide spectrum of levels of integration. In a game such as a Q&A type game, participants use the DGRC to select game options, respond to challenges, and, in some cases, manage player scores, timers, and other game flow and progression. In highly integrated games, each DVD-based game is authored to operate with the DGRC and the DVD player in a manner that tailors the buttons and functionality of the DGRC to the particular game. For example, in one Q&A game, each of four buttons of the DGRC may be used to select each of four answers, while in another game, the same four buttons may be used instead for directional navigation.

In one embodiment, such tailoring is accomplished by providing with each game a new "map" between the buttons of the DGRC and the functionality of the DVD player. Specifically, DVD players typically provide some kind of mapping between buttons on a remote controller and operations (functions or actions) that control various aspects of the DVD player. When a button on a remote controller is selected (activated), the signal transmitted by the remote controller is then interpreted by the receiver (or transceiver) in the DVD player to cause to occur the action that was previously mapped to the button. For example, pressing an [>>] button on a remote controller may cause the DVD player to perform a "fast forward" operation, as previously defined and implemented by the DVD player. In some DVD players, the mapping between the transmitted signal and the action that is invoked as a result is provided using a resident program (or hardware or firmware) of the DVD player that operates on data (a "button map") downloaded from a DVD onto the DVD player to control the mapping. The DVD player provides a published means for modifying this mapping including the format for the data. One of ordinary skill in the art will also appreciate that other embodiments where the remote button mapping is downloaded from an external source to the DVD player are also possible.

For example in one embodiment, when a DVD game is authored, a new button map is written to the DVD that specifies what operations/actions are to be invoked when the buttons on the DGRC that transmit signals to the DVD player are pressed. Later, when the DVD is first read by the DVD player, this map is downloaded into memory of the DVD player according to well-known techniques and as appropriate to the DVD player implementation. By providing a new map with each DVD game, the buttons on the DGRC can be "programmed" to cause various predefined actions on the DVD player to be executed. An action can be to process ("go to," load, select, skip to, etc.) any pre-specified item on a DVD medium: for example, a track, marker, story, menu, script, slideshow, or a single slide. This new map alters how the signals transmitted by the DGRC are interpreted by the DVD player. After downloading a new map, the DGRC then appears to operate in potentially a different fashion—specific to the DVD game being played. The operations/actions and hence the actual button map will depend upon the particular implementation of the DGRC—how many buttons it has that are configured to transmit signals to the DVD player (there may be additional buttons on the DGRC that are only interpreted by the DGRC and that do not transmit signals).

Preferably, the DGRC buttons are assigned actions that are make sense within the context of a particular DVD game. For example, the buttons on a DGRC can be assigned to specific responses. To program a multiple choice Q&A pair there may be four possible responses of answer "A", answer "B", answer "C", or answer "D". Each response can be mapped to one of four DGRC text buttons 209–212 labeled "A", "B", "C", and "D," where button "A" selects answer "A", button "B" selects answer "B", button "C" selects answer "C", and button "D" selects answer "D." Example explanations of how a game author can create mappings for remote controller buttons using DVD content are described in the DVD Studio Pro 2 Manual, Apple Computer, Inc, 2003, which is incorporated herein by reference in its entirety.

A DGRC programmed in this manner allows a game participant to minimize the number of buttons needed to be pressed to play the game. This feature is particularly beneficial for DVD games played with young children or other persons whose fine motor skills may be less agile. A more traditional model of navigation, for example that used by remote control devices such as those used for controlling TV programs, would require manipulating direction navigation keys to get to the correct selection and then depressing a selection button to signal activation. For example, the multiple choice Q&A pair example above would require a participant to press between 2 and 5 buttons using a traditional remote controller model.

One skilled in the art will also recognize that the DGRC of the present invention can be built to operate with any type of defined mapping mechanism. Also, DVDs support hierarchical mappings of buttons to DVD player functions. Thus, at times other than when the DVD is first read, new maps can be downloaded from the DVD that vary the button mappings in response to displayed content.

In addition to game-specific button mappings that control the behavior of a DVD player, a DGRC can be programmed to behave in a game-specific manner by downloading additional functionality and/or content from the removable memory media associated with the DGRC and mapping some or all of DGRC buttons to DGRC-specific functions that do no necessarily communicate with the DVD player. In such cases, the DGRC may be programmed to determine which "mode" the button is in (communication with the DGRC or with the DVD player) and then to transmit a signal to the DVD player if appropriate. Alternatively, the DGRC can transmit both a signal to the DVD player and information to the DGRC, and any unneeded or not understood communication will simply be ignored.

Figure 4:
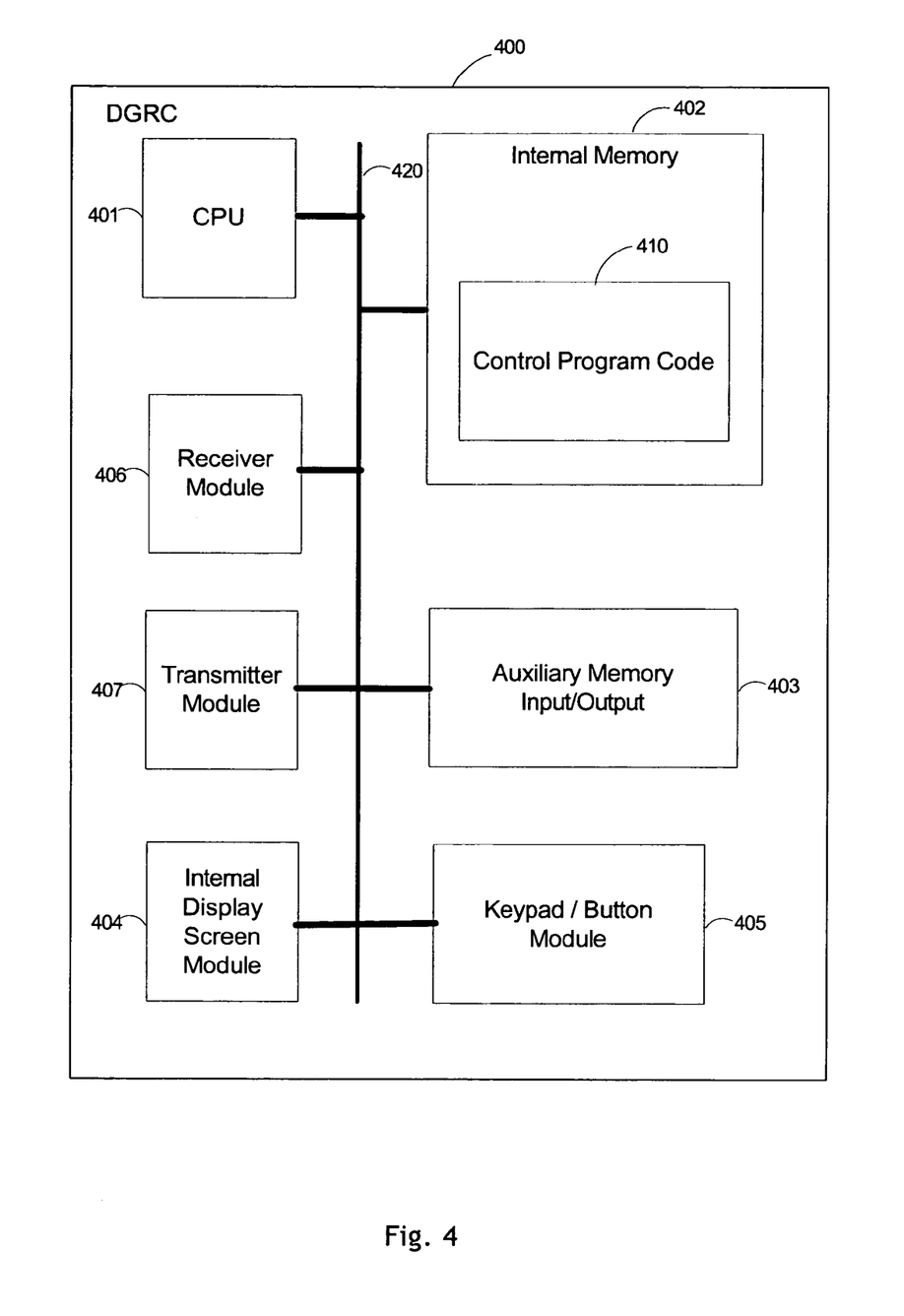
FIG. 4 is an example block diagram of functional components of an example DVD Game Remote Controller for practicing embodiments of the present invention.

FIG. 4 is an example block diagram of functional components of an example DVD Game Remote Controller for practicing embodiments of the present invention. These components can be implemented in various combination of hardware, software, and firmware using off-the-shelf or standard parts. An example DGRC 400 includes a central processing unit ("CPU") 401; a communication bus 420; a memory 402; an auxiliary memory input/output ("I/O") mechanism 403; internal display screen module 404; a keypad/button, or other user control input module 405; transmitter module 407; and receiver module 406. The CPU 401 communicates with all of the other components of the DGRC 400 over communication bus 420. Memory 402 comprises any kind of programmable memory, for example an EPROM, that can contain DGRC control code 410 (e.g., a program) for implementing default DGRC functions such as input and output processing, scoring functions, timer functions, scoreboard support, etc. as appropriate for the particular DGRC implementation. The DGRC control program 410 resides in the memory 402 and executes on CPU 401 to communicate over communications bus 420 to the various other components, such as the internal display screen module 404, which outputs data onto an integrated display screen such as screen 208 in FIG. 2. Auxiliary memory I/O module 403 may comprise a card reader, for example, capable of reading data and code from an auxiliary memory device such as auxiliary memory that inserts into media slot 220 in FIG. 2. In typical operation of the DGRC 400, logic implemented by transmitter module 407, upon receiving instructions, transmits signals such as IR signals using well known mechanisms through a transmitter such as transmitter 217 to a corresponding DVD player. Correspondingly, logic present in receiver module 406 receives signals from the receiver 216 (received typically from one or more buzz-in remotes), and notifies the DGRC control program 410. The keypad/button input module 405 detects game participant input and notifies the DGRC control program 410 appropriately. One skilled in the art will recognize that many other organizations and distribution of function can be implemented in an DGRC embodiment, and that FIG. 4 represents one such example. Variations such as combining multiple functions in one module or laying out the components in a particular way are contemplated. For example, the term "communication bus" is used to refer to any communication means for communication between modules residing on the DGRC. One skilled in the art will recognize that one or more such means may be included and that the functions of the bus may be distributed accordingly.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/577,446, entitled "DVD Game Architecture," filed Jun. 4, 2004; and U.S. Provisional Patent Application No. 60/519,017, entitled "DVD Game Remote Controller," filed Nov. 12, 2003, are incorporated herein by reference, in their entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems discussed herein are applicable to differing protocols, communication media (optical, wireless, cable, etc.) and devices, such as wireless handsets, infrared controlled handheld devices, navigation devices such as GPS receivers, telephones, etc., and other handheld devices that can be programmed now and in the future to communicate with a DVD player.

The invention claimed is:

1. A method in a remote control device for arbitrating between a plurality of game participants playing a DVD-based electronic game having game control logic that controls game flow and having game challenges stored on a DVD medium that are presented to the game participants and are selectable by the game control logic, comprising:
   receiving an indication of a desire to respond to a current challenge in a game turn from a plurality of auxiliary devices, each associated with one of the game participants;
   determining which of the received indications was the first received indication;
   designating the game participant associated with the auxiliary device that corresponds to the determined first received indication as the next participant to respond to the current challenge; and
   notifying the game control logic of the designated next participant.

2. The method of claim 1 wherein the plurality of auxiliary devices are buttons on the remote control device and the indications received by the remote control device are received from the buttons.

3. The method of claim 1 wherein the plurality of auxiliary devices are wired or wireless auxiliary remote devices that communicate with the remote control device by transmitting signals and the indications received by the remote control device are received from signals transmitted by the auxiliary remote devices.

4. The method of claim 3 wherein the signals transmitted by the auxiliary remote devices are infrared signals.

5. The method of claim 3 wherein the signals transmitted by the auxiliary remote devices are radio frequency signals.

6. The method of claim 1 wherein an auxiliary device indicates the desire to respond to the current challenge in response to a game participant pressing a "buzz-in" button.

7. The method of claim 1, further comprising:
   tracking an order the indications of the desire to respond are received;
   determining that the designated next participant did not respond to the current challenge correctly; and
   designating a new next participant based upon the tracked order, thereby giving another one of the game participants an opportunity to respond to the current challenge.

8. The method of claim 1 wherein the DVD-based electronic game is a DVD-game that contains game flow logic stored along with the game challenges on the DVD.

9. The method of claim 1 wherein the DVD-based electronic game is a DVD-enabled game having game flow logic that is stored external to the DVD and that selects content from the DVD.

10. The method of claim 9 wherein the DVD-enabled game is a board game used in conjunction with a DVD containing game presentation material.

11. The method of claim 9 wherein the DVD-enabled game is a personal game console game used in conjunction with a DVD containing game presentation material.

12. A computer readable memory medium containing instructions downloadable to a remote control device that, when executed by a computer processor in the remote control device, cause the device to arbitrate between a plurality of game participants playing a DVD-based electronic game, by:
- receiving an indication of a desire to respond to a current challenge in a game turn from a plurality of auxiliary devices, each associated with one of the game participants;
- determining which of the received indications was the first received indication;
- designating the game participant associated with the auxiliary device that corresponds to the determined first received indication as the next participant to respond to the current challenge; and
- notifying the game control logic of the designated next participant.

13. The memory medium of claim 12, further containing instructions that control the remote control device by:
- tracking an order the indications of the desire to respond are received;
- determining that the designated next participant did not respond to the current challenge correctly; and
- designating a new next participant based upon the tracked order, thereby giving another one of the game participants an opportunity to respond to the current challenge.

14. The memory medium of claim 12 wherein the DVD-based electronic game is a DVD-game that contains game flow logic stored along with the game challenges on the DVD.

15. The memory medium of claim 12 wherein the DVD-based electronic game is a DVD-enabled game having game flow logic that is stored external to the DVD and that selects content from the DVD.

16. A remote control device used by a plurality of game participants to play a DVD-based electronic game having game control logic that controls game flow, comprising:
- a transmitter that transmits signals to a DVD player, each indicating an instruction to perform an action that is associated with the DVD-based electronic game;
- a receiver that receives signals that indicate a desire to respond to a current challenge in a single game turn from a plurality of auxiliary devices, each associated with one of the game participants;
- game arbitration logic that is structured to
  - receive from the receiver a plurality of indications, each indicating a corresponding game participant that desires to respond to the current challenge;
  - determine which of the received signals was received first in time;
  - designate based upon the determined first received signal a next game participant; and
  - provide to the game control logic an indication of the designated next game participant so that a next signal transmitted by the transmitter that corresponds to the current challenge is associated with the designed next game participant.

17. The remote control device of claim 16 wherein the game arbitration logic is further structured to cause display of an indication of the next game participant.

18. The remote control device of claim 17, further comprising an integrated display screen and a speaker, wherein the displayed indication is at least one of a backlit button, an audio sound, or an indication of the designated participant on the integrated display screen.

19. The remote control device of claim 16 wherein the plurality of auxiliary devices are wired or wireless remote devices, each having a buzz-in button that causes a signal to be transmitted that is received by the receiver of the remote control device.

20. The remote control device of claim 16 wherein the receiver receives infrared or radio frequency signals from the plurality of auxiliary devices.

21. The remote control device of claim 16 wherein the game control logic resides and executes on the remote control device.

22. The remote control device of claim 16 wherein the DVD-based electronic game is a DVD game that stores the game control logic on the DVD with game content.

23. The remote control device of claim 16 wherein the DVD-based electronic game is a DVD-enabled game.

24. The remote control device of claim 16 wherein the game arbitration logic is structured to track an ordering that the signals that indicate the desire to respond are received so that a new next game participant is designated based upon the tracked ordering when a response to the current challenge is determined to be incorrect.

25. A wired or wireless auxiliary remote device used to transmit signals to a separate remote controller that controls a DVD player to present a DVD-based electronic game, comprising:
- a buzz-in button that transmits a signal to the remote controller to indicate a desire to respond to a current game challenge presented on a display associated with the DVD player; and
- a special feature button that transmits a signal to the remote controller to initiate the presentation of a game-specific feature associated with the DVD-based electronic game.

26. The auxiliary remote device of claim 25 wherein the signals transmitted are infrared or radio frequency signals.

27. The auxiliary remote device of claim 25 wherein the special feature button causes presentation of an audio or video clue related to a current game challenge.

28. The auxiliary remote device of claim 25 wherein the special feature button causes a game-specific presentation to be displayed on the display associated with the DVD player.

29. The auxiliary remote device of claim 25 wherein the special feature button is associate with a scoring bonus or a scoring penalty.

30. The auxiliary remote device of claim 25 used in conjunction with at least one other similarly configured auxiliary remote device to respond concurrently to a game challenge.

31. A remote controller used with a DVD-based electronic game having game control logic that controls the flow of the game, comprising:
- an integrated display screen;
- a plurality of buttons that indicate to the game control logic responses to game challenges and instructions to the game control logic; and
- a timer button that selectably causes the remote controller to start an adjustable countdown timer associated with a current game challenge or to initiate tracking of elapsed time for the game participants to respond to game challenges, whereby the tracked elapsed time is displayed on the integrated display screen.

32. The remote controller of claim 31 whereby the tracked elapsed time tracks a separate cumulative time for each game participant.

33. The remote controller of claim 31 whereby the tracked elapsed time tracks a total cumulative elapsed time for multiple of the game participants.

34. The remote controller of claim 31 whereby the tracked elapsed time tracks a total cumulative elapsed time for the entire game.

35. The remote controller of claim 31 wherein the plurality of buttons are used to control the timer button to select values for the countdown timer.

36. The remote controller of claim 31 wherein the plurality of buttons are used to control tracking preferences associated with the timer button.

37. The remote controller of claim 31 wherein the game control logic resides and executes on the remote controller.

38. The remote controller of claim 31 wherein the DVD-based electronic game is a DVD game that stores the game control logic on the DVD with game content.

39. The remote controller of claim 31 wherein the DVD-based electronic game is a DVD-enabled game.

40. A remote controller used with a DVD-based electronic game having game control logic that controls the flow of the game, comprising:
  a plurality of buttons that, when activated, indicate to the game control logic responses to game challenges and instructions to the game control logic; and
  a roll button that, when activated, simulates a roll of a die to determine a result, causes display of a visualization of the result, and forwards the result to the game control logic to advance the DVD-based game in accordance with the result.

41. The remote controller of claim 40 wherein the visualization comprises at least one of a color, a number, a category, text, a graphic, or a representation of a face of the die.

42. The remote controller of claim 40 further comprising an integrated display screen and wherein the roll button causes the display of the visualization of the result on the integrated display screen.

43. The remote controller of claim 42 wherein the visualization comprises at least one of a color, a number, a category, text, a graphic, or a representation of a face of the die.

44. The remote controller of claim 40 wherein the plurality of buttons are used to control preferences associated with the roll button.

45. The remote controller of claim 40 wherein the roll button simulates the roll of the die by randomly choosing one of a plurality of possible results associated with the die.

46. The remote controller of claim 40 wherein the determined result is used to adjust an automatically tracked score associated with a game participant.

47. The remote controller of claim 46 wherein the adjustment results in a scoring bonus or a scoring penalty.

48. The remote controller of claim 40 wherein the game control logic resides and executes on the remote controller.

49. The remote controller of claim 40 wherein the DVD-based electronic game is a DVD game that stores the game control logic on the DVD with game content.

50. The remote controller of claim 40 wherein the DVD-based electronic game is a DVD-enabled game.

51. A remote control device used to provide an automated game board to supplement a DVD-based electronic game having game control logic that controls the flow of the game including selecting game content from the DVD for presentation on a display device associated with a DVD player, comprising:
  an integrated display screen that displays a visualization of the game board and a current position on the game board associated with each game participant;
  a plurality of buttons that indicate to the game control logic responses to game challenges and further instructions to the game control logic; and
  a scoring module that contains logic structured to
    receive an indication of activation of one of the plurality of buttons;
    determine based upon the received indication a response to a current game challenge; and
    adjust the visualization of the game board displayed on the integrated display screen in accordance with the determined response.

52. The remote controller of claim 51 wherein the visualization concurrently shows a current position or score of each participant.

53. The remote controller of claim 51 wherein the DVD-based game is a DVD game that stores the game control logic on the DVD along with the game content.

54. The remote controller of claim 51 wherein the DVD-based game is a DVD-enabled game wherein the game control logic is executed by the remote controller and selects game content from the DVD to be displayed.

55. The remote controller of claim 51 wherein the DVD-based game also displays a current score for a current game participant on the display device associated with the DVD player.

56. The remote controller of claim 51, further comprising:
  a score button that selectably causes the remote controller to edit a score of a game participant, to display statistics associated with a game participant, or to display a current representation of scores for each of the game participants.

57. A remote control device used with a DVD-based electronic game having game control logic that controls the flow of the game, comprising:
  an integrated display screen;
  a plurality of buttons that indicate to the game control logic responses to game challenges and instructions to the game control logic;
  a score button that selectably causes the remote controller to display scores, edit scores, or display multiple game statistics on the integrated display;
  a timer button that selectably causes the remote controller to control an adjustable countdown timer, to initiate tracking of elapsed time for the game participants, or to display timer related values on the integrated display screen;
  a roll button that simulates a roll of a die, displays a visualization of a result of the simulated roll, and causes the game control logic to adjust a location or score of a current game participant accordingly; and
  a media slot for receiving media that contains auxiliary game related content or updates to functions for controlling processing of at least one of the score button, the timer button, or the roll button.

58. The remote control device of claim 57 wherein the game control logic resides and executes on the remote control device.

59. The remote control device of claim 57 wherein the DVD-based electronic game is a DVD game that stores the game control logic on the DVD with game content.

60. The remote control device of claim 57 wherein the DVD-based electronic game is a DVD-enabled game.

* * * * *